United States Patent [19]

Nishimura et al.

[11] Patent Number: 5,253,080
[45] Date of Patent: Oct. 12, 1993

[54] PICTURE SIGNAL BINARIZATION APPARATUS AVOIDING A NEED FOR MEMORY DEVICES OR SHIFT REGISTERS FOR STORING BINARY PICTURE SIGNALS BEFORE OUTPUT

[75] Inventors: Shinichi Nishimura, Atsugi; Hiroyuki Kudose, Isehara; Shingo Yamaguchi, Atsugi, all of Japan

[73] Assignee: Ricoh Company, Ltd., Tokyo, Japan

[21] Appl. No.: 749,433

[22] Filed: Aug. 26, 1991

[30] Foreign Application Priority Data

Aug. 28, 1990 [JP] Japan .................................. 2-227530

[51] Int. Cl.⁵ .................................................. H04N 1/40
[52] U.S. Cl. .................................... 358/445; 358/457; 358/465; 358/466
[58] Field of Search ............... 358/445, 446, 447, 456, 358/455, 465, 466

[56] References Cited

U.S. PATENT DOCUMENTS

| 4,578,715 | 4/1986 | Yamaguchi | 358/457 |
| 4,903,143 | 2/1990 | Sakamoto | 358/457 |
| 4,942,478 | 7/1990 | Yagamishi et al. | 358/445 |
| 5,148,495 | 9/1992 | Imao et al. | 358/466 |

FOREIGN PATENT DOCUMENTS

| 0191682 | 10/1984 | Japan | 358/466 |
| 60-264166 | 12/1985 | Japan . | |

*Primary Examiner*—Edward L. Coles, Sr.
*Assistant Examiner*—Kimberly Williams
*Attorney, Agent, or Firm*—Mason, Fenwick & Lawrence

[57] ABSTRACT

A picture signal binarization apparatus includes two comparators for converting an analog signal into a binary signal by comparing the analog signal with two different thresholds, two counters for counting inversions of the binary signal from each comparator and supplying a count signal indicative of the number of inversions of the binary signal from each of the comparators, and a selection part for selecting a binary signal from one of the comparators in response to the count signal supplied from one of the counters so that the selected binary signal is outputted as a subsequent output binary signal, the number of inversions indicated by the count signal from the one of the counters first reaching a predetermined value.

8 Claims, 2 Drawing Sheets

PICTURE SIGNAL BINARIZATION APPARATUS AVOIDING A NEED FOR MEMORY DEVICES OR SHIFT REGISTERS FOR STORING BINARY PICTURE SIGNALS BEFORE OUTPUT

BACKGROUND OF THE INVENTION

The present invention relates generally to a picture signal binarization apparatus, and more particularly to a picture signal binarization apparatus which converts an analog signal or multilevel image signal into binary "1" or "0" image signals, by comparing it with a given threshold value, the binary "1" or "0" signals representing black or white levels of picture elements.

In a picture processing system including a facsimile machine, a picture signal binarization circuit binarizes analog picture signals into binary "1" or "0" signals, the analog picture signals being supplied by an analog type scanner like an image sensor by scanning a document including a picture thereon. But, the optical density of a picture recorded on a document varies depending on the document being scanned, and the picture signal binarization circuit uses two comparators each having a different threshold level with which the analog picture signals are compared for the binarization. Japanese Laid-Open Patent Application No. 60-264166, for example, discloses a prior art picture signal binarization apparatus which includes two comparators, two counters and a selection part. In this picture signal binarization apparatus, inversions of each of the binary picture signals from the two comparators are counted by each of the counters during a given unit period, the binary picture signals being changed from high level (binary "1" level) to low level (binary "0" level) or vice versa. The two counters each supply to the selection part a signal indicative of the result of the counting. On the basis of the signals from the two counters, the selection part selects an effective output binary signal for the unit period which is the binary signal from one counter having a greater number of inversions than that of the inversions of the binary signal from the other counter. In other words, the effective binary signal from the one counter selected by the selection part is changed from high level to low level or vice versa more frequently during the given unit period than the binary signal from the other counter. The binary picture signals from the two comparators are each stored in a memory device. The number of inversions of the binary signal from one counter is compared with the number of those from the other counter, and then the effective binary picture signal with a greater number of inversions for a unit period is selected by the selection part. And, the effective binary binary picture signal is outputted from the memory device in which the binary signal from the one counter is stored. Thus, the prior art picture signal binarization apparatus can provide binary picture signals suitably, regardless of whether fine lines of a picture pattern on a document are dense or sparse.

However, the prior art apparatus requires additional memories (or shift registers) for storing binary picture signals for a given unit period during which inversions of the binary picture signals are counted by each of the counters, and requires a comparing circuit for comparing the number of inversions of binary picture signals from one counter with the number of those from the other counter. Therefore, the prior art picture signal binarization apparatus has a problem in that a complicated apparatus must be produced due to such memories and comparators. Thus, the manufacturing cost thereof becomes high.

SUMMARY OF THE INVENTION

Accordingly, it is a general object of the present invention to provide an improved picture signal binarization apparatus in which the above described problems are eliminated.

Another and more specific object of the present invention is to provide a picture signal binarization apparatus which comprises a plurality of comparators for converting a picture signal into a binary signal by comparing the picture signal with a plurality of different threshold values, a plurality of counters for counting inversions of the binary signal from each of the comparators and supplying a count signal indicative of whether the number of inversions of the binary signal from each of the comparators reaches a predetermined value, and a selection part for selecting a binary signal from one of the comparators in response to the count signal supplied from one of the counters so that the selected binary signal is outputted as a subsequent output binary signal, the number of inversions indicated by the count signal from the one of the counters first reaching the predetermined value. According to the present invention, the picture signal binarization apparatus does not require memory devices (or shift registers) in which binary picture signals are stored before outputting them, nor additional comparators for comparing the numbers of inversions of binary picture signals which are converted from analog signals by the two comparators. It is therefore possible to construct a simple apparatus for performing the picture signal binarization whose manufacturing cost is low. Also, the present invention allows a high quality picture to be generated accurately and stably from the binary picture signals, regardless of whether fine lines indicated by input picture signals from a document are dense or sparse.

Other objects and further features of the present invention will become more apparent from the following detailed description when read in conjunction with the accompanying drawings.

DESCRIPTION OF THE PREFERRED EMBODIMENT

Figure 1:
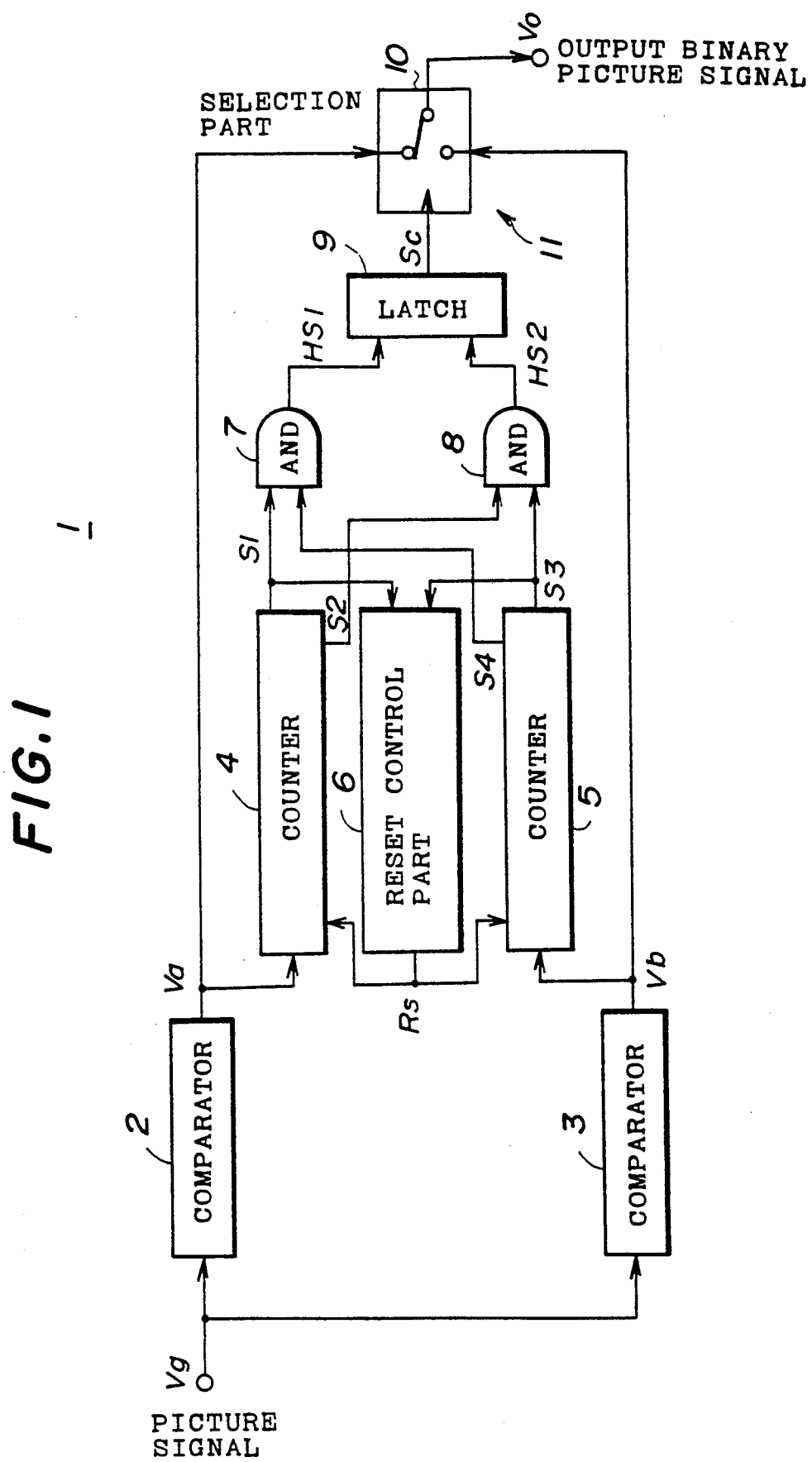
FIG. 1 is a block diagram showing a preferred embodiment of a picture signal binarization apparatus according to the present invention.

First, a description will be given of an embodiment of a picture signal binarization apparatus according to the present invention, with reference to FIG. 1. FIG. 1 shows a picture signal binarization circuit 1 which includes two comparators 2, 3, two counters 4, 5, a reset control part 6, two AND circuits 7, 8, a latch part or latch circuit 9, and a switching part or switching circuit 10. A picture signal Vg is input to the two comparators 2, 3, and this picture signal is an analog signal or multilevel digital signal supplied by scanning a document by a picture reading unit such as an image sensor. The image sensor is, for example, a line scanner employing charge coupled devices (CCDs). The comparator 2 converts the input picture signal Vg into a binary "0" or "1" signal Va on the basis of a given threshold level TH1, this binary signal Va from the comparator 2 being supplied to the counter 4 and to the switching part 6. The comparator 3 converts the input picture signal Vg into a binary "0" or "1" signal Vb on the basis of a given threshold level TH2 which is different from the threshold level TH1, this binary signal Vb from the comparator 3 being supplied to the counter 5 and to the separation part 10.

The counter 4 counts inversions of the binary picture signal Va from the comparator 2, the signal Va being changed from "0" level (or white level) to "1" level (or black level) or vice versa. As a result, the counter 4 supplies a signal S1 to the AND circuit 7, this signal S1 being indicative of whether the number n1 of inversions of the signal Va thus counted reaches a predetermined value N1 or not. The counter 4 also supplies a signal S2 to the AND circuit 8, the signal S2 being indicative of whether the number n1 as described above is smaller than a predetermined value M1. The value N1 is greater than the value M1 and a relationship between the value N1 and the value M1 is represented as follows:

$$N1 > M1 \quad (1)$$

Similarly, the counter 5 counts inversions of the binary picture signal Vb from the comparator 3, and supplies a signal S3 to the AND circuit 8, this signal S3 being indicative of whether the number n2 of inversions of the binary picture signal Vb thus counted reaches a predetermined value N2 or not. The counter 5 also supplies a signal S4 to the AND circuit 7, the signal S4 being indicative of whether the number n2 described above is smaller than a predetermined value M2. A relationship between the value N2 and the value M2 is represented by:

$$N2 > M2 \quad (2)$$

When the signal S1 from the counter 4 indicates that the number n1 of inversions of the binary picture signal Va has reached the predetermined value N1, the reset control part 6 outputs a reset signal Rs to the counters 4 and 5 so that the number n1 in the counter 4 and the number n2 in the counter 5 are reset to zero. Also, when the signal S3 from the counter 5 indicates that the number n2 of inversions of the binary picture signal Vb has reached the predetermined value N2, the reset control part 6 outputs a reset signal Rs to the counters 4 and 5 so that the number n1 in the counter 4 and the number n2 in the counter 5 are reset to zero.

The AND circuit 7 performs an AND operation with the signal S1 supplied from the counter 4 and the signal S4 from the counter 5, so that the AND circuit 7 outputs an effective picture selecting signal HS1 to the latch part 9 only when the number n1 of inversions by the counter 4 reaches the value N1 and the number n2 of inversions by the counter 5 is smaller than the value M2. Also, the AND circuit 8 performs an AND operation with the signal S2 supplied from the counter 4 and the signal S3 from the counter 5, so that the AND circuit 8 outputs an effective picture selecting signal HS2 to the latch part 9 only when the number n1 in the counter 4 is smaller than the value M1 and the number n2 in the counter 5 has reached the value N2.

The selecting signal HS1 is supplied by the AND circuit 7 to the latch part 9 only when the number n1 of inversions counted by the counter 4 has reached the value N1 but the number n2 of inversions counted by the other counter 5 does not reach the value M2 (N2 > M2). Also, the signal HS2 is supplied by the AND circuit 8 to the latch part 9 only when the number n2 counted by the counter 5 has reached the value N2 but the number n1 counted by the other counter 4 does not reach the value M1 (N1 > M1). This allows an hysteresis effect to be added, and the picture signal binarization apparatus of the invention serves to prevent the level of an output binary picture signal from being varied excessively. Therefore, when a first inversion number (n1 or n2) counted by one of the two counters 4, 5 has reached a predetermined first value (N1 or N2), the AND circuits 7, 8, which form a detection part of the picture signal binarization apparatus, make a determination as to whether a second inversion number (n2 or n1) counted by the other counter is smaller than a predetermined second value (M1 or M2) that is different from the first value (N1 or N2).

The latch part 9, which is made up of, for example, a S-R latch circuit, supplies a control signal Sc to the switching part 10, in response to the selecting signal HS1 inputted by the AND circuit 7, and the switching part 10 is controlled so that the binary picture signal Va from the comparator 2 is selected and outputted as the effective output signal Vo at the subsequent output timing. Also, the latch part 9 supplies a control signal Sc to the switching part 10, in response to the selecting signal HS2 inputted by the AND circuit 8, and the switching part 10 is controlled so that the binary picture signal Vb from the comparator 3 is selected and outputted as the effective output signal Vo at the subsequent output timing. In this manner, the binary picture signal Va from the comparator 2 and the binary picture signal Vb from the comparator 3 are input to the switching part 10, and the switching part 10 selects one of the two binary picture signals Va and Vb, in response to the control signal Sc received from the latch part 9, so that the selected binary picture signal is outputted as the effective output signal Vo.

Accordingly, the latch part 9 and the switching part 10 form a selection part 11, as shown in FIG. 1, and this selection part 11 selects one of the two binary picture signals Va, Vb from the respective comparators 2, 3, and the inversion number (n1 or n2) of the selected binary picture signal counted by one of the two counters 4, 5 which has first reached a predetermined value (N1 or N2), so that the selected binary picture signal is outputted by the selection part 11 as the effective output signal Vo at the subsequent output timing. More specifically, in a case where the inversion number n1 of the selected binary picture signal counted by the counter 4 has reached a predetermined value N1, the selection part 11 selects one of the binary picture signals from the comparators, provided it is determined that the inversion number n2 of the binary picture signal counted by the other counter is smaller than a predetermined value M2 that is different from the value N1.

Next, a description will be given of the operation of a picture signal binarization apparatus according to the present invention, with reference to FIG. 2. According to the present invention, when an analog picture signal Vg is supplied from a picture scanning unit (not shown), the two comparators 2, 3 binarize the analog picture signal Vg into a binary signal on the basis of two different threshold levels. The two counters 4, 5 count the inversions of the binary signals from the two comparators for a given unit period, and the two counters then output a signal to the selection part, the signal being indicative of the number of inversions of the binary signal. The selection part selects as the effective output picture signal the binary signal from one of the counters in which the number of inversions first reaches a predetermined value.

Figure 2:
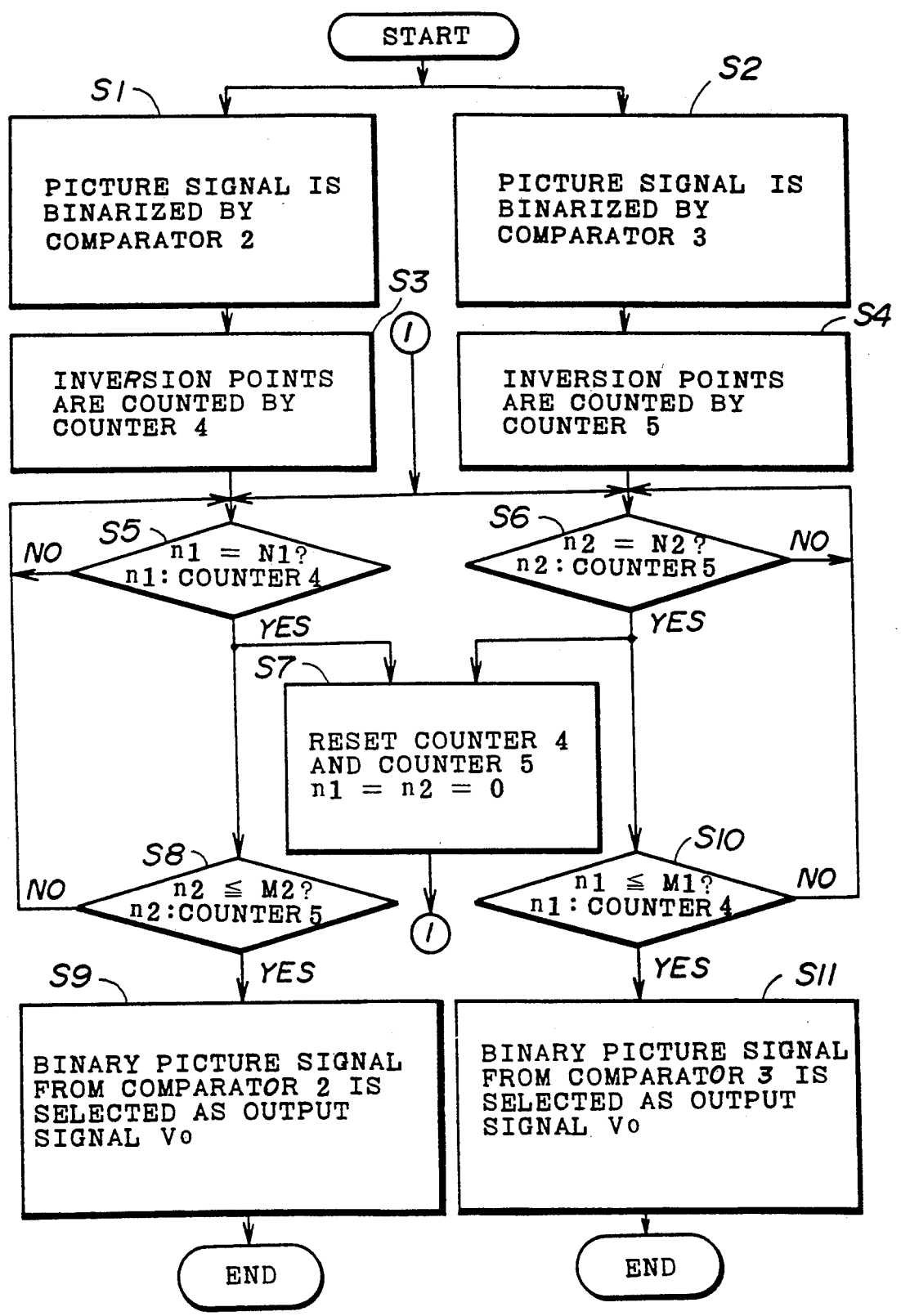
FIG. 2 is a flow chart for explaining a binarization which is performed by the picture signal binarization apparatus of the present invention.

In a step S1 of the flow chart shown in FIG. 2, an analog picture signal Vg inputted by a picture scanning unit (not shown) is converted by the comparator 2 into a binary picture signal Va which may be either a binary "1" signal representing a black level or a binary "0" signal representing a white level. This binary picture signal Va is supplied to the counter 4 and to the switching part 10. In a step S3, the counter 5 counts the inversions of the binary picture signal Va from the comparator 2 and outputs a signal, indicative of the number n1 of the inversions, to the switching part 10. Similarly, in a step S2, the analog picture signal Vg is converted by the comparator 3 into a binary picture signal Vb, which is supplied to the counter 5 and to the switching part 10. And, in a step S4, the counter 5 counts the inversions of the binary picture signal Vb from the comparator 3 and outputs a signal indicative of the number n2 of the inversions to the switching part 10.

A step S5 makes a determination as to whether the number n1 of the inversions of the binary picture signal Va from the counter 4 has reached a predetermined value N1. A step S6 makes a determination as to whether the number n2 of the inversions of the binary picture signal Vb from the counter 5 has reached a predetermined value N2. If it is determined in the step S5 that the number n1 has reached the predetermined value N1, then a reset signal Rs is outputted to each of the counters 4, 5 so that the counted numbers n1 and n2 in the counters 4 and 5 are reset to zero in a step S7. A step S8 makes a determination as to whether the number n2 of the inversions of the binary picture signal Vb from the counter 5 is smaller than a predetermined value M2. If it is determined in the step S8 that the number n2 from the counter 5 is smaller than the predetermined value M2, then the AND circuit 7 outputs an effective picture selecting signal HS1 to the latch part 9, and the latch part 9 supplies a control signal Sc to the switching part 10 so that the switching part 10 selects as the output binary picture signal Vo the binary picture signal Va sent from the comparator 2. In the subsequent operations of the picture signal binarization apparatus, the switching part 10 is controlled so that it selects the binary picture signal Va sent from the comparator 2. If it is determined in the step S8 that the number n2 from the counter 5 is not smaller than the predetermines value M2, then the switching part 10 selects the previously selected picture signal which may be either the binary picture signal Va from the comparator 2 or the binary picture signal Vb from the comparator 3, and the previously selected picture signal is outputted. Then, the process returns back to the step S5.

On the other hand, when the number n2 of inversions of the binary picture signal Vb from the counter 5 reaches the predetermined value N2, a reset signal Rs is outputted to each of the counters 4, 5 so that the counted numbers n1, n2 in the counters 4, 5 are reset to zero. A step S10 makes a determination as to whether the number n1 of the inversions of the binary picture signal Va from the counter 4 is smaller than a predetermined value M1. If it is determined in the step S10 that the number n1 from the comparator 2 is smaller than the predetermined value M1, then a reset signal Rs is outputted to the counter 4 and to the counter 5, so that the counted numbers n1, n2 in the counters 4, 5 are reset to zero in a step S7.

If it is determined in the step S10 that the number n1 from the counter 4 is smaller than the predetermined value M1, then the AND circuit 8 outputs an effective picture selecting signal HS2 to the latch part 9 and the latch part 9 supplies a control signal Sc to the switching part 10, so that the switching part 10 selects as the output binary picture signal Vo the binary picture signal Vb sent from the comparator 3 in a step S11. If it is determined in the step S9 that the number n1 from the comparator 2 is not smaller than the predetermined value M1, then the switching part 10 selects the previously selected binary picture signal which may be either the binary picture signal Va sent from the comparator 2 or the binary picture signal Vb sent from the comparator 3, and the previously selected binary picture signal is outputted. The process then returns back to the step S6.

Accordingly, the picture signal binarization apparatus of the invention no longer requires memory devices or shift registers in which binary picture signals are stored before they are outputted, nor additional comparators for comparing the numbers of inversions of binary picture signals which are converted from analog signals by the two comparators. It is therefore possible to construct a simple picture signal binarization apparatus for performing the binarization whose manufacturing cost is low. Also, the present invention allows a high quality picture to be generated stably from the binary picture signals, regardless of whether fine lines indicated by input picture signals from a document are dense or sparse. In the picture signal binarization apparatus of the present invention, a hysteresis effect can be added, which serves to prevent the level of the output binary picture signals from being varied excessively, and therefore provides the outputted picture with high quality.

In the above mentioned embodiment, two comparators are provided for converting an analog signal into binary signals by comparing the analog signal with each of the two different threshold levels, and two counters are provided to count inversions of each of the binary signals from the two comparators. However, the present invention is not limited to this embodiment. It is also applicable to a picture signal binarization apparatus in which two or more comparators and two or more counters are provided. As the number of the comparators as well as the number of the counters provided in the picture signal binarization circuit increases, the binarization circuit can provide more accurate binary picture signals and the outputted picture from the binarization circuit has a better image quality.

Further, the present invention is not limited to the above described embodiment, and variations and modifications may be made without departing from the scope of the present invention.

What is claimed is:

1. A picture signal binarization apparatus comprising:
   a plurality of comparators for converting a picture signal into a binary signal by comparing said picture signal with a plurality of different threshold values;
   a plurality of counters for counting inversions of the binary signal from each of said comparators and supplying a count signal indicative of whether the number of inversions of the binary signal from each of said comparators reaches a predetermined value; and means for selecting a binary signal from one of the comparators in response to the count signal supplied from one of the counters so that said selected binary signal is outputted as a subsequent output binary signal, the number of inversions indicated by the count signal from said one of the counters first reaching said predetermined value.

2. The apparatus as claimed in claim 1, wherein said selecting means includes a latch part and a switching part, said latch part supplying a control signal to the switching part, in response to a signal sent from said one of the counters when the number of inversions counted by said one of the counters first reaches said predetermined value and the number of inversions counted by another counter is smaller than a predetermined second value, so that the switching part serves to select the binary signal from one of the comparators whose inversions are counted by said one of the counters.

3. The apparatus as claimed in claim 1, further comprising detection means for determining, when the number of inversions counted by said one of the counters first reaches a predetermined first value, whether the number of inversions counted by said another counter is smaller than a predetermined second value.

4. The apparatus as claimed in claim 3, wherein said detection means includes a plurality of AND circuits to which said count signal is sent from each of the counters, the AND circuits each supplying a select signal to said selecting means only when the number of inversions counted by said one of the counters first reaches said predetermined value and the number of inversions counted by said another counter is smaller than a predetermined second value.

5. A picture signal binarization apparatus comprising:
a plurality of comparators for converting a picture signal into a binary signal by comparing said picture signal with a plurality of different threshold values;
a plurality of counters for counting inversions of the binary signal from each of said comparators and supplying a count signal indicative of whether the number of inversions of the binary signal from each of said comparators reaches a predetermined value;
detection means for determining, when the number of inversions of a binary signal counted by one of the counters first reaches a predetermined first value, whether the number of inversions of a binary signal counted by another counter is smaller than a predetermined second value; and
selection means for selecting a binary signal supplied by one of the comparators, only when the number of the inversions counted by said one of the counters first reaches said predetermined first value and it is determined by said detection means that the number of inversions counted by said another counter is smaller than said predetermined second value, so that said selected binary signal is outputted as a subsequent output binary signal.

6. The apparatus as claimed in claim 5, wherein said detection means includes a plurality of AND circuits to which said count signal is sent from each of the counters, the AND circuits each supplying a select signal to said selecting means only when the number of inversions counted by said one of the counters first reaches said predetermined first value and the number of inversions counted by said another counter is smaller than said predetermined second value.

7. The apparatus as claimed in claim 5, wherein said predetermined first and second values are preset so that the first value is smaller than the second value.

8. The apparatus as claimed in claim 5, wherein said selecting means includes a latch part and a switching part, said latch part supplying a control signal to the switching part, in response to a signal sent from said one of the counters when the number of inversions counted by said one of the counters first reaches said predetermined value and the number of inversions counted by said another counter is smaller than a predetermined second value, so that the switching part serves to select the binary signal from said one of the comparators whose inversions are counted by said one of the counters.

* * * * *